UNITED STATES PATENT OFFICE.

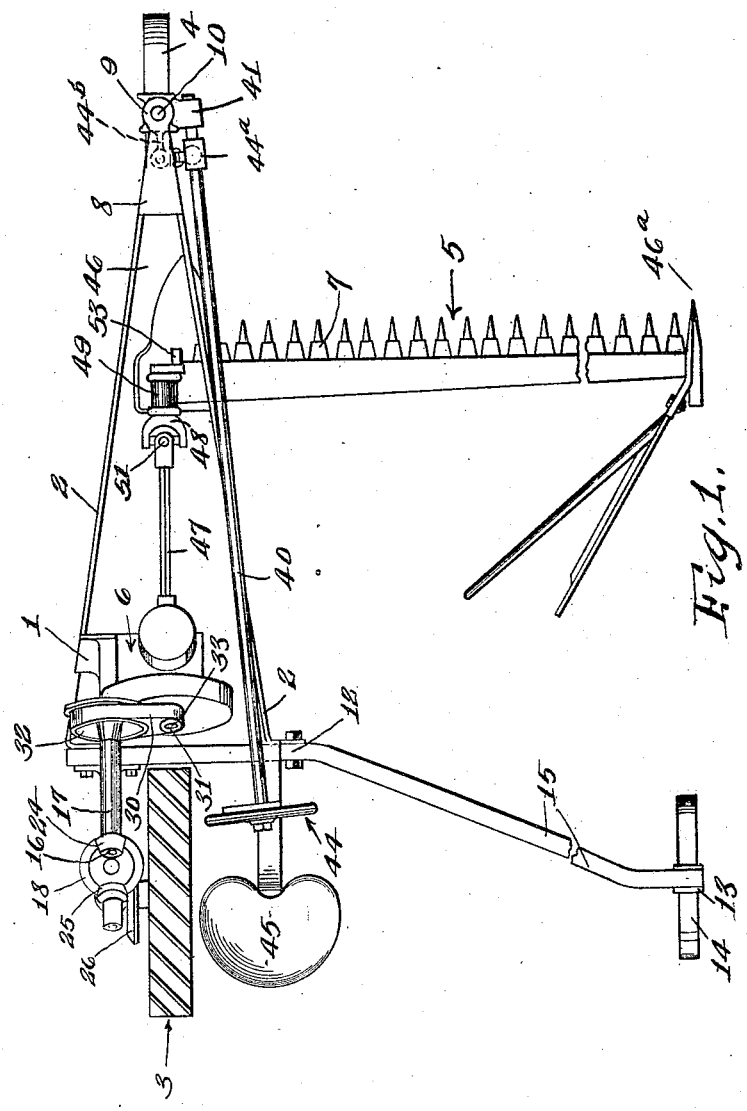

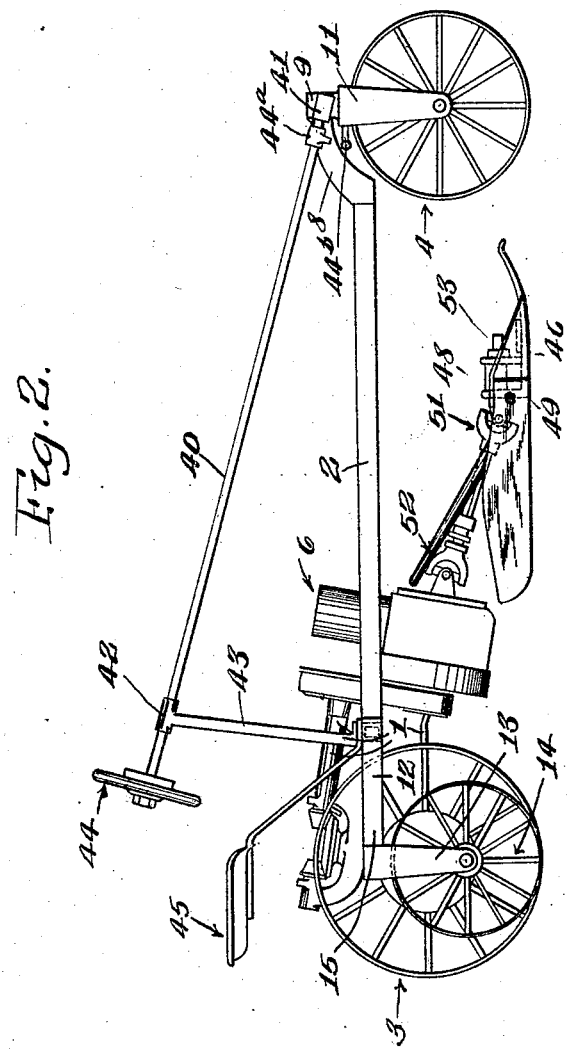

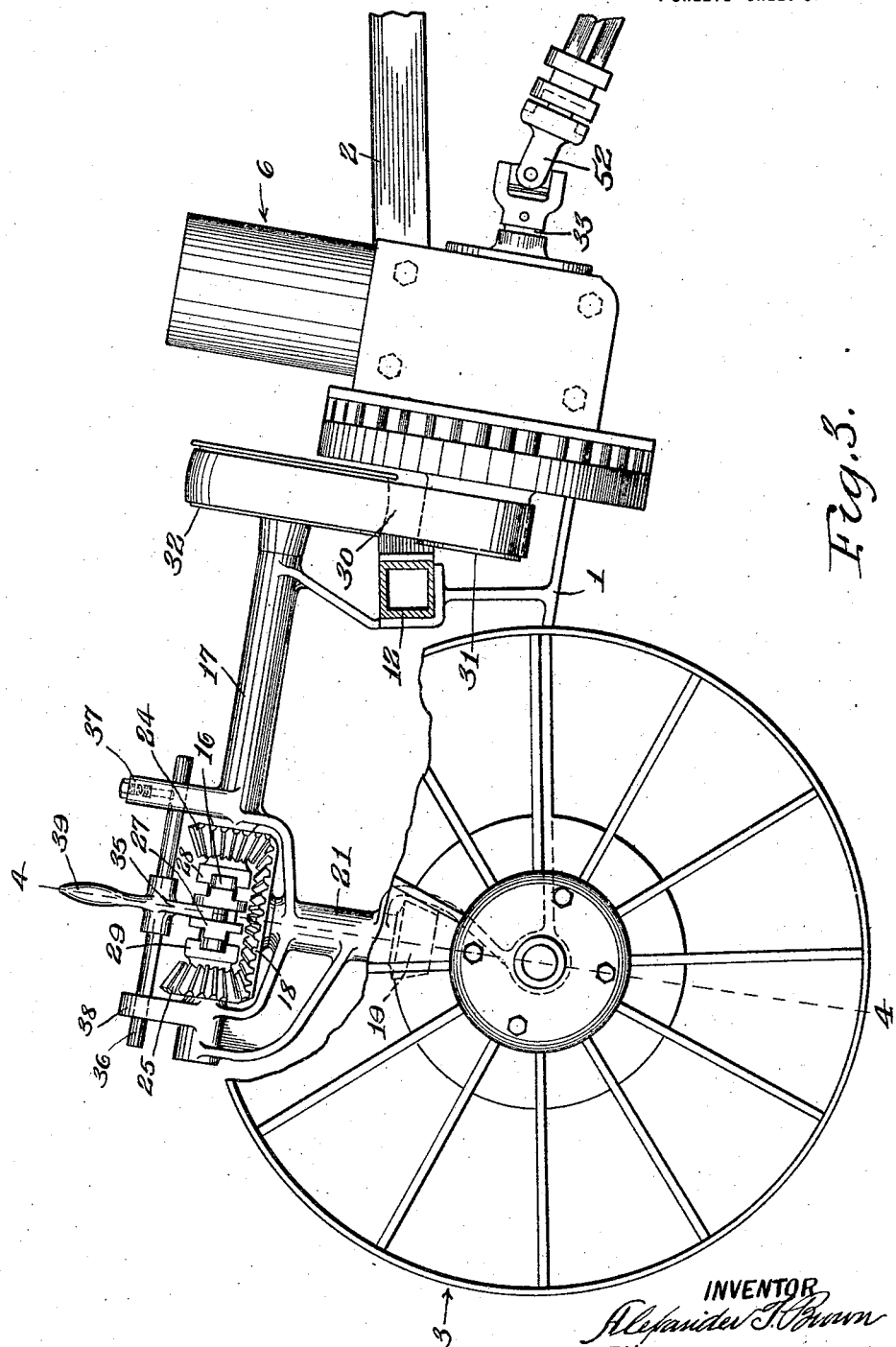

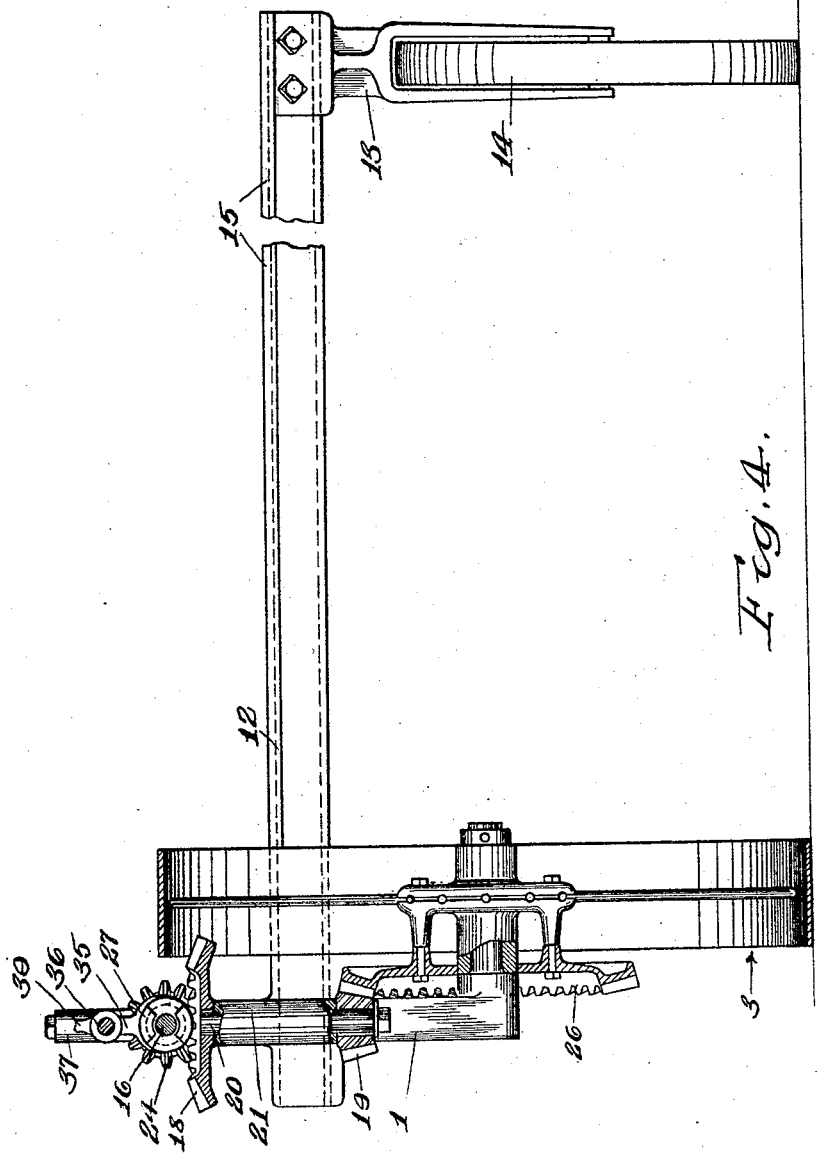

ALEXANDER T. BROWN, OF SYRACUSE, NEW YORK.

AGRICULTURAL MACHINE.

1,416,259.  Specification of Letters Patent.  Patented May 16, 1922.

Application filed July 23, 1919. Serial No. 312,720.

*To all whom it may concern:*

Be it known that I, ALEXANDER T. BROWN, a citizen of the United States, and a resident of Syracuse, in the county of Onondaga and State of New York, have invented a certain new and useful Agricultural Machine, of which the following is a specification.

This invention has for its object a particularly simple and efficient motor agricultural machine, as a mower, and it consists in the novel features, and in the combinations and constructions hereinafter set forth and claimed.

In describing this invention, reference is had to the accompanying drawings in which like characters designate corresponding parts in all the views.

Figure 1 is a plan view, parts being omitted of a mower embodying my invention.

Figure 2 is a side elevation thereof.

Figure 3 is an enlarged elevation, partly broken away and partly in section of the rear portion of the machine.

Figure 4 is a sectional view taken on line 4—4, Fig. 3.

This machine comprises generally, a main frame, a tractor wheel at the one end of the frame, a steering wheel at the other end of the frame, an implement carried by the frame and power transmitting means between the engine and the tractor wheel and between the engine and the movable element of the implement or mower.

1 designates the main frame including a body or casting which carries the engine, tractor wheel axle and power transmitting means between the engine and the tractor wheel.

2 are side bars converging forwardly from the main frame; 3 is the tractor wheel at the rear end of the frame; 4 the steering wheel and 5, the implement as a mower. 6 is the engine which is connected to the tractor wheel 3 and to a movable element as a reciprocating knife 7 of the mower. The side bars 2 are secured at their front ends to a block 8 having a vertical bearing 9 in which is mounted the spindle 10 of the fork 11 of the steering wheel 4. The frame also includes a laterally extending element 12 which carries a fork 13 at its outer end in which a third wheel 14 is mounted.

The laterally extending frame element 12 is in this embodiment of my invention an extension of a cross bar 15 and inclines rearwardly so that the axle of the third wheel 14 is in the vertical plane of the axis of the tractor wheel 3.

The power transmitting means between the engine 6 and the tractor wheel 3 may be of any suitable form, size and construction and as here shown includes a shaft 16 journaled in a bearing 17 carried at the upper edge of the frame, gears 18 and 19 mounted on the upper and lower ends of an upwardly extending shaft 20 journaled in a bearing 21 in the frame 1, the gears 18, 19 meshing respectively with gears 24, 25 loosely mounted on the shaft 16 and a gear 26 rotatable with the tractor wheel 3, a clutch section 27 mounted on and rotatable with the shaft 16 and shiftable from neutral position shown in Fig. 3 into and out of engagement with clutch faces 28, 29 on the gears 24 and 25 respectively to connect either one of said gears to the shaft 16, and means for transmitting power from the crank shaft of the engine to the shaft 17. This means as here shown consists of a belt 30, Fig. 1 running over pulleys 31 and 32 on the crank shaft 33 of the engine and on the shaft 16.

The clutch section 27 is shiftable by any suitable means as a fork 35 mounted on a rod 36 slidable in suitable brackets 37 and 38 to carry the clutch section from neutral position into engagement with either the clutch faces 28 or 29. The fork is provided with a suitable handle 39. When the fork is shifted forwardly to carry the clutch section 27 into engagement with the clutch section 28 and hence lock the gear 24 to the shaft 16, the motion will be transferred from the engine to the tractor wheel to cause the tractor wheel to rotate in a forward direction and move the machine forwardly and when the clutch section 27 is shifted to engage the clutch face 29 and hence lock the gear 25 to the shaft 16 the tractor wheel will be rotated in a rearward direction.

The shaft 16 is operatively connected to and disconnected from the engine shaft and as here shown it is so connected to and disconnected from the engine by tightening and loosening the belt 30, Figs. 1 and 2.

The steering wheel 4 is operated to guide the machine by means of a steering post 40 journaled at its front end in a bearing 41 carried by the block 8 and at its rear end in the bearing 42 carried at the upper end of a standard 43 rising from the frame. A suitable hand wheel 44 is mounted on the rear end of the post within reach of the seat 45 carried by the frame between the wheels 3 and 14 and near the wheel 3, the seat being so located that the shifting fork 35, and the levers controlling the engine and other power transmitting parts are within reach of the seat. The motion of the steering post is transferred to the fork 11 of the steering wheel in any suitable manner as by an arm 44ª depending from the rod 40 and connected by a universal joint to an arm 44ᵇ extending rearwardly from the fork 11.

The implement is in this embodiment of my invention shown as a mower including the finger bar and the reciprocating knife 7 extending laterally from the frame between the front and rear ends of the frame, the finger bar being supported in any suitable manner. One way of supporting said mower is illustrated in my Patent No. 1,247,073, Nov. 20, 1917, and having shoes 46, 46ª at its inner and outer ends.

As illustrated, the reciprocating mower knife 7 is driven from the crank shaft of the engine and the power transmitting means between the crank shaft of the engine includes a shaft 47 consisting of two sections, one movable endwisely relatively to the other to compensate for the up and down movement of the finger bar when floating over the ground, a shaft 48 journaled in suitable bearings 49 on the shoe 46 at the inner end of the finger bar, a universal joint 51 connecting the shaft 47 and the shaft 48, a universal joint 52 connecting the rear end of the shaft 47 and the crank shaft 33 of the engine.

The shaft 48 is provided with a suitable crank 53 connected by a pitman to the mower knife to reciprocate the same. The shoe 46 at the inner end of the finger bar is located in the rear of the steering wheel 4 so that the steering wheel 4 rolls down any obstructions or loose grass from clogging knife in the path of the shoe.

A swath board 54 extends rearwardly and inwardly from the other shoe 46ª. The swath board sweeps the cut grass or grain out of the path of the wheel 14 and also it sweeps the cut grass out of the way of the knife when a cut has been made along one side of the field through the corner of the standing grain or grass and the machine is backed up and turned, to position the knife to cut the grass or grain when the machine is started forward in a direction at an angle to its previous path just cut. During the backing up and turning, the swath board and knife bar sweep the cut grass out of the way at the corner that would otherwise be in front of the knife after the machine has been reversed and positioned. This cut grass if not removed might clog the knife sometimes.

The swath board in addition to clearing a path for the caster wheel also clears a path for the steering and tractor wheels during the next run around the field, as the steering wheel and tractor wheel travel in nearly the same path as that previously traversed by the caster wheel.

What I claim is:

In an agricultural machine, a frame, a steering wheel at the front end of the frame, a tractor wheel at the rear end of the frame in line with the front wheel whereby said wheels travel in substantially the same path, a cutting implement extending laterally from the frame, near the front end thereof and having a shoe in the rear of the steering wheel and a swath board arranged at the outer end of the cutting implement in the rear thereof to sweep a path for the tractor and steering wheels on the next run around the field, and a laterally extending frame member in the rear of the cutting implement and having a supporting wheel arranged in the rear of the swath board in the path swept thereby, substantially as and for the purpose described.

In testimony whereof, I have hereunto signed my name, at Syracuse, in the county of Onondaga, and State of New York, this 24th day of June, 1919.

ALEXANDER T. BROWN.